Aug. 9, 1960   J. CORRIGAN   2,948,424
METHOD FOR HANDLING SUGAR
Original Filed Oct. 14, 1954   2 Sheets-Sheet 2
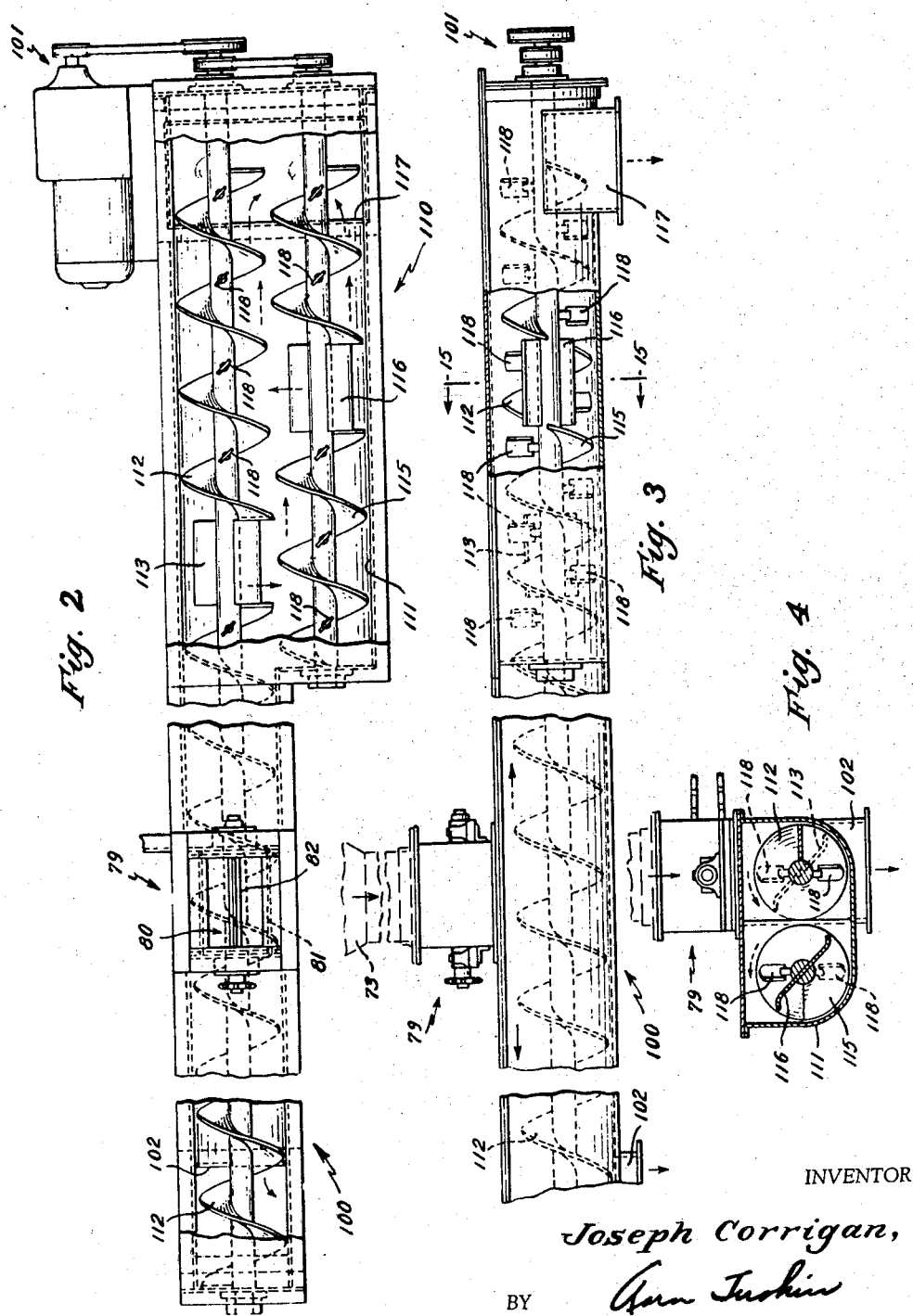
INVENTOR
Joseph Corrigan,
BY
ATTORNEY

United States Patent Office 2,948,424
Patented Aug. 9, 1960

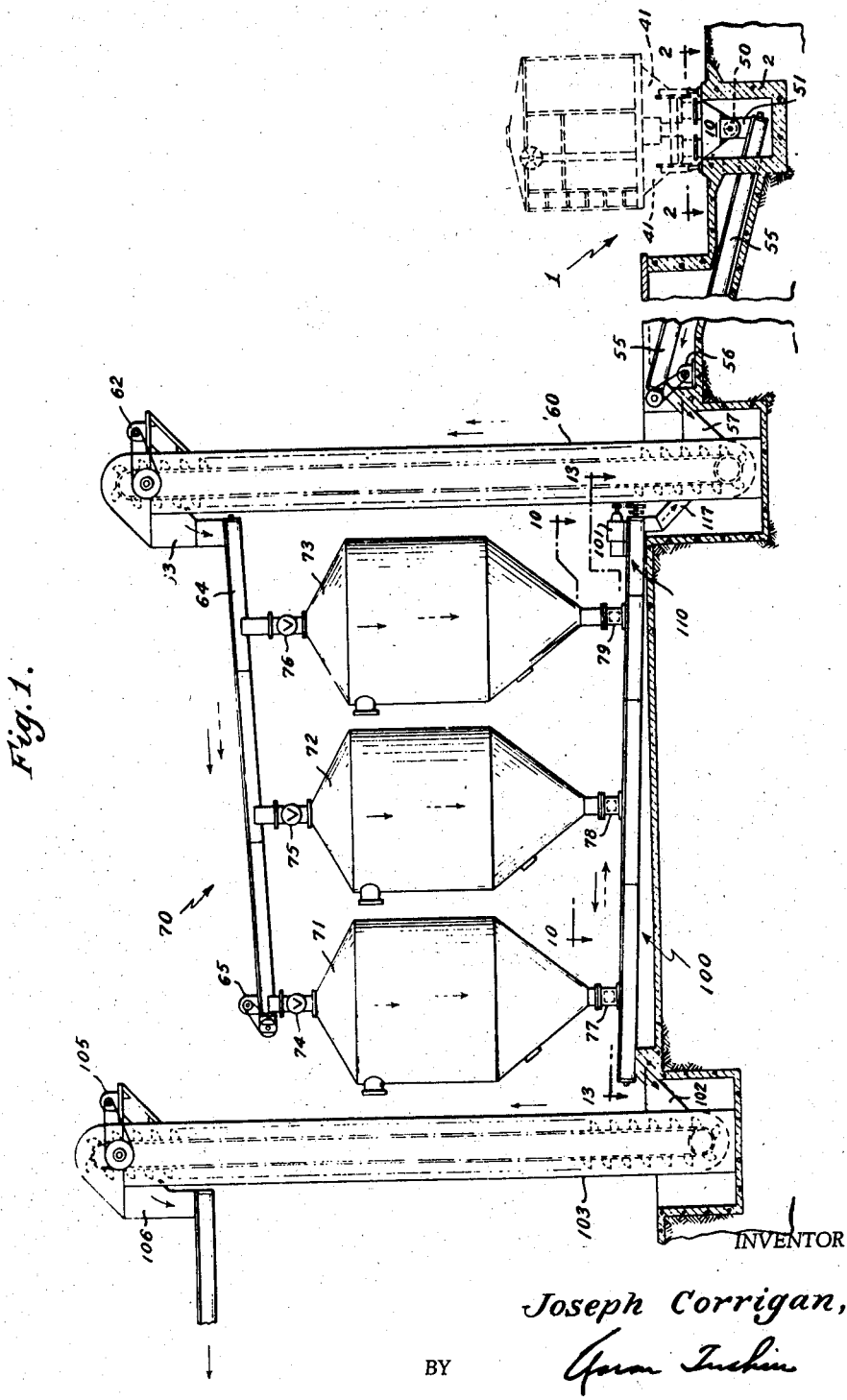

2,948,424

METHOD FOR HANDLING SUGAR

Joseph Corrigan, Newton, Mass., assignor to J. C. Corrigan Company, Inc., Dorchester, Mass., a corporation of Massachusetts Original application Oct. 14, 1954, Ser. No. 462,181, now Patent No. 2,856,083, dated Oct. 14, 1958. Divided and this application Feb. 17, 1958, Ser. No. 715,787

7 Claims. (Cl. 214—152)

This invention comprises novel and useful improvements of an automatic conveyor system and in general has reference to a conveyor system and method that greatly facilitates the movement of bulk, granulated or powdered material into or out of storage and which includes means and method to prevent and eliminate lumping or caking of such material immediately prior to or during the storage thereof. More particularly this invention relates to an improved conveyor system and method for the automatic transportation, into or out of large-scale storage, of bulk granulated or powdered hygroscopic materials, such as sugar, salt, flour and the like, and which circulates or recirculates such material among a plurality of storage bins to prevent lumping or caking thereof, and which provides additional means to prevent and eliminate lumping or caking of such material immediately prior to or during the storage thereof. This application is a division of applicant's parent application, Serial No. 462,181, filed on October 14, 1954, for Method and Apparatus for Handling Sugar, now Patent No. 2,856,083, issued October 14, 1958.

Formerly, hygroscopic materials such as sugar, salt, flour, chemicals, or the like, were transported to the storage plants of large scale users in bags. Dirt and dust were often found in these bags and various contaminants were found within them. Regardless of precautions, it was practically impossible to prevent foreign material from entering the finished products in which the hygroscopic material was used. Furthermore, handling of the bags in which the hygroscopic material was stored was inevitably accompanied by leakage, breakage and waste, and was a relatively expensive procedure.

In the field of materials handling, the transportation or movement into or out of storage of bulk granulated, crushed, or powdered material is not new, per se. It is only in recent times that the large scale bulk handling of bulk granulated or powdered hygroscopic material has been attempted. These efforts, made to overcome the inefficiency, cost and difficulty of handling such material in bags, has, till now, met with rather indifferent success mainly because of the strong tendency of hygroscopic materials, such as sugar, salt, flour, chemicals, and the like, to form lumps or become caked to their containers, storage bins or transportation cans. Such lumping and caking not only obstructs the free flow of the hygroscopic material and therefor impedes its handling in bulk during its movement into or out of storage, but also results in deteriorated quality and spoilage or waste during storage. To overcome these handicaps imposed on bulk handling of hygroscopic granulated or powdered material by the formation of lumps and caked layers often requires tedious procedures that are time-consuming as well as expensive and which may outweigh the advantages that otherwise might be offered by modern bulk-handling techniques. In aggravated cases of lumpiness or caking of the hygroscopic material stored in bulk, shutdown of the storage plant becomes inevitable while the lumps and cake material are steamed or chipped away and results in serious loss of material, time and money.

In attempts to overcome and prevent the formation of lumps or caking of the hygroscopic material, agitating devices of various sorts have been tried but since it is impractical to agitate, at one time, more than a small portion of the bulk hygroscopic material usually stored by large scale users of the material, such devices have generally been found ineffective. The problem of lumping or caking of bulk hygroscopic material is present during normal operational periods of the storage plant when movement of the material as it is being stored or withdrawn tends to decrease the tendency to lump or cake and when spilled, personnel are present to watch for and prevent such deterioration, but the problem becomes serious when the storage plant is shut down for repairs and during holidays or other inactive storage plant periods that need not be of great duration.

This invention, which overcomes the above-described disadvantages of prior methods of handling bulk hygroscopic granulated or powdered materials, is generally directed to the bulk handling of such hygroscopic materials as granulated or powdered sugar, salt, flour, chemicals and the like, immediately prior to and during the storage of such material in the storage plants of large scale users thereof. By means of this invention, the bulk hygroscopic material is unloaded from a freight car, such as that described in my patent application Ser. No. 439,116 titled Condensation-Proof Car and filed June 24, 1954, is conveyed into the storage plant and there diverted and guided to fill any of a plurality of storage bins. Also to prevent and eliminate caking or the formation of lumps of the hygroscopic material, the methods of this invention provide means for circulating and recirculating the hygroscopic material among the storage bins after such material has been conveyed to the bins. In addition, the methods to be described permit the material to be dispensed from storage in the amounts required for immediate use. All the operations performed through the methods which comprise this invention take place automatically and without wasting the hygroscopic material and in a manner that reduces handling cost, yet maintains the original purity of the hygroscopic granulated or powdered material.

In particular my invention is directed to the prevention and elimination of caking or the formation of lumps of bulk hygroscopic granulated or powdered material such as sugar, salt, flour, chemicals, etc. during the unloading, conveying and storage thereof in a processing plant. Thus during temporary shutdowns of the plant during the night, on weekends, or because of temporary processing equipment failure, or for plant shutdowns due to other causes, the hygroscopic material may be continuously recirculated within the in-plant storage facilities with or without added means for breaking up any lumps or caked layers of the hygroscopic material that may exist or be formed immediately prior to or during the storage period in spite of all precautions taken to prevent such a result.

This invention is also directed to the handling of bulk hygroscopic material such as granulated or powdered sugar, salt, flour, chemicals, etc. in a plant wherein the material is stored in bins and conveyed for use in processing equipment with other materials as needed, and has the important feature, when processing is not desired or feasible, of reversing the direction of flow of the hygroscopic material from the storage bins to cause said material to recirculate among the bins and through the conveying equipment to prevent the formation of caked layers or lumps of said hygroscopic material. A novel important additional feature of this invention consists of the method for breaking up any lumps or caked layers of said hygroscopic material that may exist.

An object of this invention is to dispense hygroscopic material from any one or more designated storage bins to processing equipment as needed.

Another object of this invention is to circulate automatically at any desired rate the stored hygroscopic material through the storage conveying equipment and back to one or more designated storage bins to prevent the formation of caked layers or lumps of said hygroscopic material during storage.

Another object of this invention is to reverse the normal flow of hygroscopic material through the storage bins and conveyor system so that said hygroscopic material may be recirculated at any desired rate and thoroughly mixed among the several storage bins, a procedure which prevents the formation of caked layers or lumps of the said hygroscopic material during storage.

Another object of this invention is to cause the granulated or powdered hygroscopic material that is being stored or is about to be stored to pass through means which breaks up existing lumps or caked layers of hygroscopic material.

Another object of this invention is to ensure the free flow of the granulated or powdered hygroscopic material through the storage system and into the processing equipment where said material is used.

Other objects and advantages of my invention will be apparent during the course of the following description.

In the accompanying drawings, forming a part of this application, and representing only one embodiment of my invention, and wherein all conveyor or elevator systems are enclosed by suitable dust tight covers or means that protect the bulk hygroscopic material from contaminants and wherein all elements comprising the invention are rigidly supported in their proper relative positions by suitable supports or other means, Figure 1 is a side elevation view, partly diagrammatic and partly shown in section illustrating an apparatus for carrying out the principles of my invention, Figure 2 is a sectional plan view, with parts broken away, taken upon the plane of the section line 13—13 of Figure 1 showing the reversible spiral conveyor and its special breaker unit together with their general driving means, Figure 3 is a front elevation view of Figure 2 with parts broken away, and Figure 4 is a view taken upon the plane of section line 15—15 of Figure 3 showing the reversible spiral conveyor and the breaker unit.

Referring now to the accompanying drawings wherein like numerals are employed to designate like parts throughout the various views:

In Figure 1 the loading, storage and recirculating system in general comprises a sealed unloading unit 1 whose foundation or pit 2 contains receiving hoppers 10 and means later described for sealed coupling of car to be unloaded to said hoppers. The material being unloaded from the car is gravity-fed through hoppers 10 to spiral conveyor 50 contained in a suitably sealed housing and located in pit 2. From outlet 51 of conveyor 50 the material is fed to the sloping spiral conveyor 55 from which it drops through chute 57 to the loading bucket elevator 60. From bucket elevator 60 the material drops through chute 63 to spiral conveyor 64 and thus enters the storage and recirculating system 70. The storage bins 71, 72, 73 have valves 74, 75, 76 respectively, which individually control the flow of material from conveyor 64 into the storage bins. Thus the flow of material to one or more storage bins may be controlled as desired.

By means of the rotary vane feeders 77, 78, 79 conveniently placed beneath storage bins 71, 72, 73 respectively, the stored material is controllably fed to spiral conveyor unit 100. If direct feeding of the material to processing equipment is desired the rotation of spiral conveyor unit 100 is such that said conveyor unit transports the material to chute 102 through which said material drops to bucket elevator 103. By means of bucket elevator 103 the material is then transported to chute 106 through which it drops to a conveying system that takes the material to automatically controlled surge hoppers which in turn drop the material onto weighing equipment that weighs the material and is set to automatically dispense any desired amount of material to processing kettles. The unloading, storage and delivery circuit described above is further indicated in Figure 1 by means of directional arrows in full lines.

If operation of the lump-breaking and recirculation features of this system is desired, the rotation of spiral conveyor unit 100 is reversed so that said conveyor unit carries the material in a direction opposite to that described above for feeding the material to processing equipment. Thus for the recirculation operation the conveyor unit 100 carries the material toward the breaker unit 110 of conveyor unit 100. As the material passes through the breaker unit 110, lumps or caked portions of the material are disintegrated by means to be described. Then the material emerging from breaker unit 110 drops through chute 117 and enters loading bucket elevator 60 which, in turn, carries the material back to the chute 63 and thence to the storage and recirculation system 70. The lump-breaking and recirculation circuit described above is further indicated in Figure 1 by means of directional arrows in broken lines.

All the spiral conveyors, bucket elevators and chutes of the entire system are enclosed in suitable housings that seal these components against water, dust or dirt.

As shown in Figure 1 material coming from the car unloading outlet 41 is gravity-fed through the stocking assembly into the receiving hopper 10 and into a conveyor trough of pit 2 of unloading unit 1. From said trough the spiral conveyor 50 transports the material to the spiral conveyor outlet 51 (Figure 1) which permits the material to drop to the sloping spiral conveyor 55. The spiral conveyor 55 of the unloading system 1 lifts the material to chute 57 which in turn discharges said material into the receiving inlet of bucket elevator 60, a component of storage and recirculating system 100. At the top of bucket elevator 60 driven by power means 62, the material is discharged through chute 63 to the spiral conveyor 64. Spiral conveyor 64, driven by power means 65, discharges the material through the individually operated valves 74, 75, 76 controlled either manually or automatically into the storage bins 71, 72 and 73 respectively.

The material stored in the storage bins 71, 82, 73 passes out from the open bottoms of said bins through the respective rotary vane feeders 77, 78, 79 when said material is to be used either in processing equipment or is to be recirculated through the storage and recirculation system 70. As shown in the drawings, each rotary vane feeder, such as 78 is permanently fixed to the open bottom of its respective storage tank such as 72 and includes the four vane assembly 80 enclosed in the cylindrical open-ended housing 81 wherein the four vanes are spaced about 90° and permanently fastened to the rotatable shaft 82 supported in suitable bearings, the planes of the vane surfaces being parallel to the shaft 82 whose axis is perpendicular to the longitudinal axis of the storage tank 72 and essentially in line with the axis of the rotatable shafts of the remaining rotary vane feeders. The rotation of the vane assembly permits the passage of stored material from the bottom of the respective storage bin 72 through the respective storage bin 72 through the respective rotary feeder 78 to the reversible spiral conveyor 100 (Figure 2). Rotation of the rotary feeder vanes stirs said material as it emerges from the bin 72 to prevent formation of lumps and also serves to break up lumps of stored material that may appear at the bottom of the storage tank to impede the free flow of the stored material. The flow from each storage bin may be controlled or stopped by proper adjustment of a clutch (not shown) which controls the rotational speed of the respective vane assembly 80.

Normally the rotational direction of the reversible spiral conveyor 100 (Figures 1 and 2) driven by reversible power means 101 is such that the granulated or powdered hygroscopic material passing into said conveyor is carried to chute 102 (Figure 1) and thence to the buckets of the second bucket elevator 103 which, driven by power means 105, lifts and discharges said material to processing equipment.

However, when the stored material is recirculated through the storage system 70 in order to prevent the formation of or eliminate the existence of lumps or caked layers of said material, the rotational direction of the spiral conveyor 100 is reversed by reversing the rotational sense of the power means 101. Under these circumstances the material passing into the spiral conveyor 100 is carried back toward the first bucket elevator 60 (Figure 1). Before reaching said elevator 60, however, all the material transported by the spiral conveyor 100 must pass through the breaker unit 110 (Figure 2) immediately adjacent said bucket elevator 60.

As shown in Figures 1 and 2 the breaker unit 110 comprises a section 112 of spiral conveyor 100 including that end of conveyor 100 nearest the bucket elevator 60, as well as another section of spiral conveyor 115 immediately adjacent, equal in length, and parallel to the spiral conveyor section 112, both sections 112 and 115 being enclosed by a suitable double housing 111. A suitable housing also encloses and seals the remainder of the reversible spiral conveyor 100. Spiral section 115, like spiral conveyor 112, is rotated by power means 101. As shown in Figure 2 the spiral thread of the spiral conveyor section 112 is interrupted by the flat kicker vane 113 fastened to and rotating with 112 and the breaker spiral conveyor section 115 is interrupted by the flat kicker vane 116 fastened to and rotating with 115. The action of kicker vanes 113 and 116 is that of "kicking" the circulating material to and fro and in conjunction with breaker paddles 118 which are set at an angle to the direction of material flow in the spiral conveyors, efficient disintegration of any lumps or cakes of the circulating material is effected.

During the recirculation process the material being transported by the spiral conveyor 100 from all or any one of the storage tanks 71, 72, 73 towards the bucket elevator 60 enters the breaker unit 110 along the spiral conveyor section 112 and is then free to be transported by both conveyor sections 112 and 115. Because the two spiral conveyor sections are closely spaced, there is very little clearance between the respective spiraling threads of said conveyor sections or between the kicker vane 113 and the spiral thread of 115 or between the vane 116 and the spiral thread of 112. Consequently, any lumps or caked portions of granulated or powdered material which enter the breaker unit 110 are forced by the rotating spiral threads or the rotating vanes 113, 116 or by the breaker paddles 118 to pass between and around the rotating sections 112, 115 as well as between said sections, vanes or paddles and the housing 111. As a consequence of such treatment, said lumps or caked portions of material are broken up into fine particles which approximate the material's original powdered or granulated size.

The material thus transported through the breaker unit 110 then flows freely into the downward sloping chute 117 (Figure 1) which discharges said material into the bucket elevator 60. The bucket elevator lifts said material back to the downward sloping chute 63 and the material is again distributed to the storage tanks 71, 72, 73 by means of the spiral conveyor 64.

It will also be apparent that the circulation of the material could be effected in a forward direction as well as the reverse direction. It should be understood that all conveyors, elevators and chutes are enclosed in suitable housings that seal the system against entry by moisture, dirt, dust, insects or small animals. In short, the material unloaded, stored, dispensed, or recirculated by means of the invention described herein is protected against all contaminating or harmful factors from the time said material leaves the car until it finally leaves the system to enter processing equipment.

In summary the invention described here comprises an improved automatic conveyor system that unloads bulk hygroscopic granulated or powdered material such as sugar, salt, flour, chemicals, etc. from a hopper bottom car; places said material in any one or more designated storage bins; dispenses said material through said bins and the conveyor system to prevent lumps or caked layers of said material from forming; and includes means to crush and eliminate during the recirculation of said material, any existing lumps or caked layers of said material.

To place the bulk hygroscopic material in storage a first bucket elevator lifts said material and discharges it into a spiral conveyor which, in turn, releases selected portions of said material into designated storage tanks through suitable valves.

To dispense the bulk hygroscopic material from the said storage tanks for use in processing equipment, said material is allowed to pass from the bottom openings of one or more designated storage tanks through the feeder unit associated with the specified tank. Each feeder unit is individually and automatically operated and includes a novel rotating vane arrangement that controls the flow of said material therefrom, stirs said material to prevent the formation of lumps or caked layers and also serves to break up lumps or caked layers of said material that appear at the bottom opening of the tank and impede the free flow of the bulk hygroscopic granulated or powdered material. Passing through the feeder unit said material falls to a spiral conveyor which, for processing of said material, transports said material to a second bucket elevator which, in turn, lifts and then discharges said material to a chute leading to the processing equipment.

To prevent lumps or caked layers of the bulk hygroscopic granulated or powdered material from forming during storage is one main function of said feeder unit. In addition, to prevent the formation of said lumps or caked layers the rotational sense of the last mentioned spiral conveyor, which receives material from the feeder units, is reversed to carry said material back to the first bucket elevator which again lifts it to the spiral conveyor which discharges into the storage tanks. The said material again passes through the storage tanks and the feeder units back to the spiral conveyor which receives said material from the feeder units. This movement and recirculation of the bulk hygroscopic granulated or powdered material prevents the formation in said material of lumps or caked layers.

In addition, to eliminate said lumps or caked layers a short length of spiral conveyor is placed closely adjacent and parallel to an equal length of the spiral conveyor which receives said material from the feeder units. Both these short lengths of spiral conveyor discharge into the first bucket elevator and are nearer to said elevator than the feeder unit associated with any storage tank. Also each section of said short length spiral conveyors contains a vane and paddles that rotate with the spiral conveyor. As a consequence of the location of the short lengths of spiral conveyor with respect to the first bucket elevator all material being recirculated passes through them. As a consequence of the closeness of the two short lengths of spiral conveyor to each other as well as the kicking and beating section of the vanes and breaker paddles therein and the slight clearance between each vane and the adjacent spiral conveyor, any lumps or caked layers in the material being recirculated are crushed and eliminated.

A preferred form of my invention is illustrated in the accompanying drawings but it is to be understood that my invention is not limited to the exact details shown for it is obvious that various changes in the shape, size, arrangement of parts and other modifications may be resorted to without departing from the spirit of my invention or the scope of the subjoined claims.

I claim:

1. The method of preventing and eliminating caking of bulk granulated hygroscopic material during storage thereof, comprising the steps of mechanically conveying discrete particles of said material to storage means and mechanically conveying all said material as discrete particles optionally along either of two paths, one leading from the storage means to a point of use of said material, the other path leading back to the storage means, all conveying being effected without substantial pressure on said material.

2. The method of preventing and eliminating caking of bulk granulated hygroscopic material during storage thereof, comprising mechanically conveying discrete particles of said material to storage means, continuously mechanically conveying said discrete particles from said storage means to a point of use when required, and continuously reversing the direction of flow to cause the continuous recirculation by mechanical means of all said material from the bottom to the top of said storage means when the use of said material is not required, all said conveying being without substantial pressure on said discrete particles.

3. The method of preventing and eliminating caking of bulk granulated hygroscopic material during storage thereof, comprising mechanically conveying discrete particles of said material to storage means, continuously mechanically conveying said discrete particles from said storage means to a point of use when required, and periodically reversing the direction of flow to cause the continuous recirculation by mechanical means of all said material from the bottom to the top of said storage means when the use of said material is not required, all conveying being effected without substantial pressure on said material.

4. The method of claim 2 including the step of mechanically disintegrating, during the recirculating step, any lumps that may be present in said hygroscopic material.

5. The method of claim 3 including the step of mechanically disintegrating, during the recirculating step, any lumps that may be present in said hygroscopic material.

6. The method for preventing the caking of granulated sugar, comprising mechanically conveying discrete particles of said sugar to storage bins, continuously mechanically conveying said sugar along a path leading from the bottom of said storage bins to points of use when required, reversing the direction of flow of said sugar leaving the storage bins when the use of said sugar is not required from the path leading to points of use to a path leading back to the top of said storage bins for mechanically recirculating all of the stored sugar until such time as the use of the same is again required, all said conveying being without substantial pressure on said discrete particles of sugar.

7. The method for preventing the caking and lumping of granular hygroscopic materials such as salt, comprising mechanically conveying discrete particles of said material to storage bins, mechanically conveying said material from the storage bins to points of use, and optionally periodically reversing the direction of flow to cause the periodic recirculation by mechanical means of all of said material from the outlet of the storage bins back to the inlet of the same, all said conveying being without substantial pressure on said discrete particles.

References Cited in the file of this patent

UNITED STATES PATENTS

| | | |
|---|---|---|
| 1,335,705 | Thoma | Mar. 30, 1920 |
| 1,851,910 | Johns | Mar. 29, 1932 |
| 2,557,841 | Preusser | June 19, 1951 |
| 2,877,929 | Ireland | Mar. 17, 1959 |

FOREIGN PATENTS

| | | |
|---|---|---|
| 571,893 | Great Britain | Sept. 13, 1945 |